(12) United States Patent
Tung et al.

(10) Patent No.: US 7,856,068 B1
(45) Date of Patent: Dec. 21, 2010

(54) NESTED PREAMBLE FOR MULTI INPUT MULTI OUTPUT ORTHOGONAL FREQUENCY DIVISION MULTIPLEXING

(75) Inventors: Chien-Cheng Tung, Fremont, CA (US); Thomas Edward Pare, Jr., Mountain View, CA (US)

(73) Assignee: Ralink Technology Corporation, Jhubei (TW)

( * ) Notice: Subject to any disclaimer, the term of this patent is extended or adjusted under 35 U.S.C. 154(b) by 1154 days.

(21) Appl. No.: 11/475,606

(22) Filed: Jun. 26, 2006

Related U.S. Application Data (60) Provisional application No. 60/694,932, filed on Jun. 28, 2005.

(51) Int. Cl.
*H04B 7/02* (2006.01)

(52) U.S. Cl. .................. 375/267; 375/260; 375/299; 375/340; 375/347; 455/101; 455/132; 455/296; 455/500; 455/562.1; 370/334

(58) Field of Classification Search .............. 375/260, 375/340, 267, 299, 347; 370/203, 206, 208, 370/210, 334; 455/101, 132, 296, 500, 562.1
See application file for complete search history.

(56) References Cited

U.S. PATENT DOCUMENTS

| | | | |
|---|---|---|---|
| 7,019,595 B1 | 3/2006 | Lo et al. | |
| 7,068,628 B2 * | 6/2006 | Li et al. | 370/334 |
| 7,197,094 B2 | 3/2007 | Tung | |
| 7,233,773 B2 * | 6/2007 | Hansen et al. | 455/69 |
| 7,245,677 B1 | 7/2007 | Pare, Jr. | |
| 7,248,650 B1 | 7/2007 | Tung et al. | |
| 7,266,146 B2 | 9/2007 | Pare, Jr. et al. | |
| 7,423,989 B2 * | 9/2008 | Hansen et al. | 370/328 |
| 7,444,134 B2 * | 10/2008 | Hansen et al. | 455/412.1 |
| 2005/0058193 A1 * | 3/2005 | Saed | 375/232 |
| 2005/0152314 A1 * | 7/2005 | Sun et al. | 370/334 |
| 2006/0092892 A1 * | 5/2006 | Trachewsky | 370/338 |
| 2006/0239375 A1 * | 10/2006 | Kim et al. | 375/267 |
| 2006/0274852 A1 * | 12/2006 | Trachewsky et al. | 375/295 |

OTHER PUBLICATIONS

Jianhua Liu et al "A MIMO System with Backward Compatibility for OFDM Based Wlans" IEEE 2003.*

* cited by examiner

*Primary Examiner*—David C Payne
*Assistant Examiner*—Leon Flores
(74) *Attorney, Agent, or Firm*—Maryam Imam; IPxLAW Group LLP (57) ABSTRACT

A multi input multi output (MIMO) system for transmitting and receiving packets having a nested preamble format included in said packets and having poly-carrier long training sequence (LTS) and signal field (SIG) for training receivers, in accordance with an embodiment of the present invention. Said packets being transmitted using the modulation scheme of a wireless local area network (WLAN) standard, said nested preamble format for allowing said receivers to use one or more receiver antennas to interpret said LTS and said SIG to increase the efficiency of said MIMO system.

32 Claims, 6 Drawing Sheets

| STS-A 8 us | LTS 8 us | SIG-A 4 us | SIG-N 8 us | ST S-N | LTS20 8 us | LTS21 4 us |
|---|---|---|---|---|---|---|

142

| STS-A' 8 us | LTS' 8 us | SIG-A' 4 us | SIG-N' 8 us | ST S-N | LTS21 8 us | LTS20 4 us |
|---|---|---|---|---|---|---|

| STS-A | LTS50 | SIG-A50 | SIG-N50 | STS-A | LTS40 | LTS41 | LTS42 | LTS43 |
|---|---|---|---|---|---|---|---|---|
| STS-A' | LTS51 | SIG-A51 | SIG-N51 | STS-A' | LTS41 | LTS42 | LTS43 | LTS40 |
| STS-A'' | LTS52 | SIG-A52 | SIG-N52 | STS-A'' | LTS42 | LTS43 | LTS40 | LTS41 |
| STS-A''' | LTS53 | SIG-A53 | SIG-N53 | STS-A''' | LTS43 | LTS40 | LTS41 | LTS42 |
| STS-A'''' | LTS54 | SIG-A54 | SIG-N53 | | | | | |

| STS-N 8 us | LTS 8 us | SIG-N 8 us |
|---|---|---|

152

150

| STS-N | LTS20 | SIG-N20 | LTS20 | | |
|---|---|---|---|---|---|
| STS-N' | LTS21 | SIG-N21 | LTS21 | | |

| STS-N | LTS30 | SIG-N30 | LTS30 | LTS31 | |
| STS-N' | LTS31 | SIG-N31 | LTS32 | LTS30 | |
| STS-N'' | LTS32 | SIG-N32 | LTS31 | | |

| STS-N | LTS40 | SIG-N40 | LTS41 | LTS42 | LTS43 |
| STS-N' | LTS41 | SIG-N41 | LTS42 | LTS43 | LTS40 |
| STS-N'' | LTS42 | SIG-N42 | LTS43 | LTS40 | LTS41 |
| STS-N''' | LTS43 | SIG-N43 | LTS40 | LTS41 | LTS42 |

*FIG. 6*

| STS-A 8 us | LTS 8 us | SIG-A 4 us | SIG-N 4 us |
|---|---|---|---|

| STS-A | LTS20 | SIG-A20 | SIG-N20 | LTS10 |
|---|---|---|---|---|
| STS-A' | LTS21 | SIG-A21 | SIG-N21 | LTS11 |

| STS-A | LTS30 | SIG-A30 | SIG-N30 | LTS31 | LTS32 |
|---|---|---|---|---|---|
| STS-A' | LTS31 | SIG-A31 | SIG-N31 | LTS32 | LTS30 |
| STS-A'' | LTS32 | SIG-A32 | SIG-N32 | LTS30 | LTS31 |

| STS-A | LTS40 | SIG-A40 | SIG-N40 | LTS41 | LTS42 | LTS43 |
|---|---|---|---|---|---|---|
| STS-A' | LTS41 | SIG-A41 | SIG-N41 | LTS42 | LTS43 | LTS40 |
| STS-A'' | LTS42 | SIG-A42 | SIG-N42 | LTS43 | LTS40 | LTS41 |
| STS-A''' | LTS43 | SIG-A43 | SIG-N43 | LTS40 | LTS41 | LTS42 |

| STS-A | LTS20 | SIG-A20 | SIG-N20 | STS-A | LTS |
|---|---|---|---|---|---|
| STS-A' | LTS21 | SIG-A21 | SIG-N21 | | |

| STS-A | LTS30 | SIG-A30 | SIG-N30 | STS-A | LTS20 | LTS21 |
|---|---|---|---|---|---|---|
| STS-A' | LTS31 | SIG-A31 | SIG-N31 | STS-A' | LTS21 | LTS20 |
| STS-A" | LTS32 | SIG-A32 | SIG-N32 | | | |

| STS-A | LTS40 | SIG-A40 | SIG-N40 | STS-A | LTS30 | LTS31 | LTS32 |
|---|---|---|---|---|---|---|---|
| STS-A' | LTS41 | SIG-A41 | SIG-N41 | STS-A' | LTS31 | LTS32 | LTS30 |
| STS-A" | LTS42 | SIG-A42 | SIG-N42 | STS-A" | LTS32 | LTS30 | LTS31 |
| STS-A''' | LTS43 | SIG-A43 | SIG-N43 | | | | |

NESTED PREAMBLE FOR MULTI INPUT MULTI OUTPUT ORTHOGONAL FREQUENCY DIVISION MULTIPLEXING

REFERENCE TO PRIOR APPLICATION

This application claims the benefit of a previously filed U.S. Provisional Patent Application No. 60/694,932 filed on Jun. 28, 2005 and entitled "NESTED PREAMBLE FOR MIMO-OFDM" and U.S. patent application Ser. No. 10/797, 299 filed on Mar. 9, 2004, and entitled "AN EFFICIENT METHOD FOR MULTI-PATH RESISTANT CARRIER AND TIMING FREQUENCY OFFSET DETECTION."

BACKGROUND OF THE INVENTION

1. Field of the Invention

The present invention relates generally to the field of preamble formats for multi input multi output (MIMO) systems and particularly to a method and apparatus for designing efficient preamble formats with forward/backward compatibility within the 802.11n standard.

2. Description of the Prior Art

Wireless local area network (WLAN) has been a very popular Internet access technology for home, office and public access. The WLAN industry has become so successful that new applications keep invented. Example applications like handset, personal digital assistant (PDA) medium adaptor, and video streaming. The expanding demand returns to drive the further progress of WLAN industry. The Institute of Electrical and Electronics Engineers (IEEE) 802.11n is one of the new WLAN standards to respond to this need.

Multiple-input-multiple-output (MIMO) is prevalently employed in communication equipment and devices. MIMO-OFDM (Orthogonal Frequency Division Multiplexing) is becoming the modulation scheme of the new high speed WLAN standard, the IEEE 802.11n. MIMO-OFDM systems include multiple transmitters and receivers for transmitting and receiving streams of data using OFDM. MIMO-OFDM systems can be denoted as nTmSrR, where n is the number of transmitter antennas, m is the number of data streams and r is the number of receiver antennas. New WLAN standard is expected to support high throughput and extended range through MIMO-OFDM.

WLAN is based on medium sharing technology based on packets instead of direct link. Packets provide excellent framework for sharing. For every transmitted packet, there is a preamble associated with it. A preamble is used to train and initialize receivers before sending data that follows the preamble. To achieve high throughput, the overhead associated with preamble length is critical for high physical (PHY) rate. Efficiency becomes one important criterion for preamble design.

Given the brod scope of the new WLAN standard, many MIMO-OFDM schemes need to work under. the same framework, therefore besides efficiency, interoperability with legacy WLAN devices and forward/backward compatibility within 802.11n modes become another challenge for preamble design.

Previous works on MIMO preamble are showed in proposals from 802.11n (11n) standard subgroups, such as WWiSE and TGnSync group. The major drawback of TGnSync preamble design is lack of efficiency, which will impact throughput especially when packet length is short. While the shortcomings of WWiSE preamble design are lack of flexibility to accommodate different features, such as transmit beamforming, and less well thought on interoperability issue between supported 11n modes.

In light of the foregoing it is desirable to design new preamble formats for efficient performance of MIMO systems which provide interoperability with legacy WLAN devices and forward/backward compatibility with the 802.11n modes. Additionally, the new preamble formats should overcome the aforementioned shortcomings of the current preamble designs.

SUMMARY OF THE INVENTION

Briefly, an embodiment of the present invention includes a multi input multi output (MIMO) system for transmitting and receiving packets having a nested preamble format included in said packets and having poly-carrier long training sequence (LTS) and signal field (SIG) for training receivers, said packets being transmitted using the modulation scheme of a wireless local area network (WLAN) standard, said nested preamble format for allowing said receivers to use one or more receiver antennas to interpret said LTS and said SIG to increase the efficiency of said MIMO system.

The foregoing and other objects, features and advantages of the present invention will be apparent from the following detailed description of the preferred embodiments which make reference to several figures of the drawing.

DETAILED DESCRIPTION OF THE PREFERRED EMBODIMENTS

Wireless local area network (WLAN) has been a very popular Internet access technology for home, office and public access. The WLAN industry has become so successful that new applications keep invented; Example applications like handset, personal digital assistant (PDA) medium adaptor, and video streaming. The expanding demand returns to drive the further progress of WLAN industry. The Institute of Electrical and Electronics Engineers (IEEE) 802.11n is one of the new WLAN standards to respond to this need.

Multiple-input-multiple-output (MIMO) is prevalently employed in communication equipment and devices. MIMO-OFDM (Orthogonal Frequency Division Multiplexing) is becoming the modulation scheme of the new high speed WLAN standard, the IEEE 802.11n. MIMO-OFDM systems include multiple transmitters and receivers for transmitting and receiving streams of data using OFDM. MIMO-OFDM systems can be denoted as nTmSrR, where n is the number of transmitter antennas, m is the number of data streams and r is the number of receiver antennas. New WLAN standard is expected to support high throughput and extended range through MIMO-OFDM.

WLAN is based on medium sharing technology based on packets instead of direct link. Packets provide excellent framework for sharing. For every transmitted packet, there is a preamble associated with it. A preamble is used to train and initialize receivers before sending data that follows the preamble. To achieve high throughput, the overhead associated with preamble length is critical for high physical (PHY) rate. Efficiency becomes one important criterion for preamble design.

Given the broad scope of the new WLAN standard, many MIMO-OFDM schemes need to work under the same framework, therefore besides efficiency, interoperability with legacy WLAN devices and forward/backward compatibility within 802.11n modes become another challenge for preamble design.

Previous works on MIMO preamble are showed in proposals from 802.11n (11n) standard subgroups, such as World Wide Spectrum Efficiency (WWiSE) and Task Group N Synchronization (TGnSync) groups. The major drawback of TGnSync preamble design is lack of efficiency, which will impact throughput especially when packet length is short. While the shortcomings of WWiSE preamble design are lack of flexibility to accommodate different features, such as transmit beamforming, and less well thought on interoperability issue between supported 11n modes. We will provide a framework that combines the strength of both WWiSE and TGnSync preambles.

Figure 1:
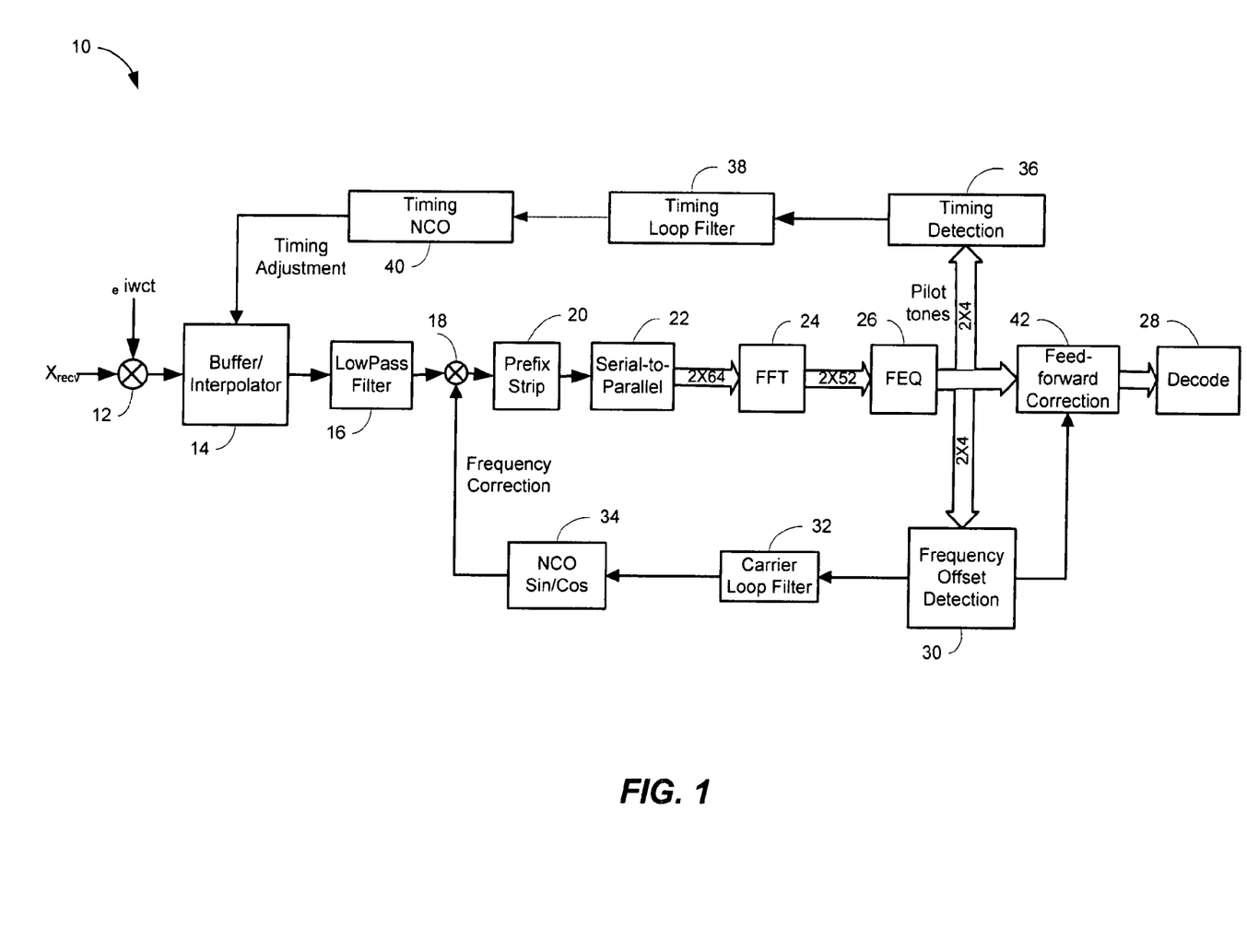
FIG. 1 shows a block diagram 10 of the architecture of an IEEE 802.11g or 802.11a orthogonal frequency division multiplexing (OFDM) modem receiver, in accordance with an embodiment of the present invention.

Referring now to FIG. 1, a block diagram 10 of the architecture of an IEEE 802.11a or 802.11g (802.11a/g) orthogonal frequency division multiplexing (OFDM) modem receiver is shown, in accordance with an embodiment of the present invention. The block diagram 10 includes a first frequency shifter 12, a buffer/interpolator 14, a low pass filter 16, a second frequency shifter 18, a serial to parallel (S/P) converter 22, a fast Fourier transform (FFT) analyzer 24, a frequency domain equalizer (FEQ) 26, a decoding module 28, a frequency offset detection module 30, a frequency loop filter or a carrier loop filter 32, a timing loop filter 38, a timing numerically controlled oscillator (NCO) 40, a carrier NCO 34, a timing offset detection module 36 and a feedforward correction module 42.

Input signals comprising information packets are received by the frequency shifter 12, which is coupled to the buffer/interpolator 14. The buffer/interpolator 14 is coupled to the low pass filter 16 that is coupled to the frequency shifter 18. The latter is coupled to the prefix strip 20. The prefix strip 20 is coupled to the FFT analyzer 24, which is coupled to the FEQ 26. The FEQ 26 is coupled to the feedforward correction module 42, the timing offset detection module 36, and the frequency offset detection module 30. The frequency offset detection module 30 is coupled to the frequency loop filter 32, which is coupled to the NCO 34. The latter is coupled to the frequency shifter 18. The timing offset detection module 36 is coupled to the timing loop filter 38, which is coupled to the NCO 40. The NCO 40 is coupled to the buffer interpolator 14. The feedforward correction module 42 is coupled to the decoding module 28.

Input signals in the intermediate frequency (IF) range, such as 10 Mega Hertz (MHz), are received by the frequency shifter 12. The transmitted signal is initially received in an analog format by an antenna through a radio frequency (RF) receiver (not shown in FIG. 1). The received signal is converted by an analog-to-digital converter (ADC) into digital format to generate the input signals. In an alternative embodiment of the present invention the RF receiver produces a base band signal directly (Zero-IF) thereby eliminating the need for the frequency shifter 12.

However, communication channel conditions are often such that multiple copies of the transmitted signal are received by the RF receiver because of multiple reflections of the transmitted signal from objects and surfaces (e.g. walls, ceiling, trees) in the receiver environment. Such a mode of reception is referred to as a multi-path channel. Multi-path channel may impede detection and compensation of the timing offset and carrier frequency or carrier offset between the transmitted signal and the input signal. The present invention alleviates such negative multi-path effects by correcting carrier frequency and sampling rate offsets through the frequency offset detection module 30 and the timing offset detection module 36, as described in more detail hereinbelow.

In one particular baseband RF implementation, the input signal at the intermediate frequency (IF) is converted by the frequency shifter 12 to a baseband (frequency) signal, which is transferred through the buffer/interpolator 14 where the timing offset is corrected to generate a buffer/interpolator output. The buffer/interpolator output is transferred through a lowpass filter, in order to remove unused spectrum, to the frequency shifter 18. The frequency shifter 18 applies the correction for the carrier frequency offset or carrier offset to the, filtered baseband signal based on the frequency feedback information in the form of frequency correction signal received from the NCO 34 to generate the adjusted signal. The adjusted signal is transferred to the prefix strip 20, where the guard interval between symbols is removed. The output of the prefix strip 20 is transferred to the serial-to-parallel converter S/P 22 where a vector signal of 64 sample values is generated. The vector signal of 64 samples is then transferred to the FFT module 24.

In one embodiment of the present invention, the FFT module 24 performs a 64-point FFT converting the 64 time domain samples into 64 frequency domain subcarriers, which comprise one data symbol. As specified by the 802.11a/g standard, each symbol has 64 subcarriers, of which 12 are reserved for guard band separation and 52 are dedicated to the transmitted signal. Of these 52 subcarriers dedicated to the transmitted signal, 4 are allocated as pilot tones for timing and frequency correction while the remaining 48 subcarriers carry the contents of the information packet (i.e., data subcarriers).

To correct the effects of multi-path channel the FEQ 26 applies complex scaling factors, or gains and phases, to compensate for the channel response for each data symbol. The FEQ 26 is trained once during the preamble portion of the information packet, by an FEQ Training Module (FTM) (discussed in detail in relation to FIG. 6) and as discussed in detail in a Provisional Patent Application with Ser. No. 60/455,157, entitled "EFFICIENT SUBCARRIER WEIGHTING TO ENHANCE RECEIVER PERFORMANCE", filed on Mar. 14, 2003, the inventors of which are Alain Chiodini and Thomas Pare, and the disclosure of which is herein incorporated by reference in its entirety. The FEQ 26 is trained to correct for the instantaneous channel conditions on each subcarrier for the remainder of the information packet. Specifically, if a particular subcarrier is deeply faded, the FEQ 26 applies a large gain thereto to amplify the response of the subcarrier.

Large FEQ gain, however, also amplifies the noise component associated with the subcarrier and, if the particular subcarrier is a pilot tone, the large FEQ may adversely affect the performance and stability of the carrier frequency and timing frequency offset loops. To avoid adverse multi-path channel, the frequency offset detection module 30 and the timing offset detection module 36 apply appropriate weights to the pilot tones. The weights are computed during the preamble portion using the FEQ coefficients corresponding to the pilot tones, or the pilot tone FEQ coefficients, by the Offset Weight Determination (OWD) module, as discussed hereinbelow. The carrier weights: $W_1$, $W_2$, $W_3$ and $W_4$ are transferred to the frequency offset detection module 30, while the timing weights, $M_1$ and $M_2$, are sent to the timing offset detection module 36. The weights are used throughout the duration of the packet to ensure proper functioning of the carrier and timing offset loops by mitigating the high pilot noise that can result from the presence of a multi-path channel, as discussed above.

The timing and carrier offset loops are updated on a per symbol basis, using the four pilot tones from the FEQ module 26 to update the frequency offset detection module 30 and the timing offset detection module 36, as depicted in FIG. 1. The output from the frequency offset detection module 30 updates the loop filter 32, which causes the NCO 34 to produce proper frequency correction that is applied at the multiplier shifter 18, on a sample-by-sample basis. In another embodiment of the present invention, NCO 34 generates proper frequency correction that is applied at the multiplier shifter 18 on a symbol-by-symbol basis. Similarly, the timing detection module 36 output updates the timing loop filter 38 which generates a timing loop filter output used in the timing NCO 40 to control the rate of interpolation at the buffer/interpolator 14 by generating a timing adjustment signal. The buffer/interpolator 14 resamples the baseband signal to adjust the timing offset using the timing adjustment signal. In total, the blocks mentioned hereinabove together with the common blocks 16, 20, 22, 24 and 42 comprise the frequency offset and timing offset control loops.

According to the 802.11a/g standard, among the 52 subcarriers 4 are the pilot tones 50-56. The pilot tones are essentially equally spaced among the subcarriers, correspond approximately to the 7, 21, 35, and 49th subcarriers. For each symbol as processed by the FEQ 26, the four pilot tones are extracted and used to compute the carrier offset. Each pilot tone is demodulated by the FFT 24, FEQ 26 processing as a BPSK (binary phase shift keying) symbol, and may be expressed as a complex number, $p_i$, i=1, 2, 3, 4, corresponding to the locations 7, 21, 35 and 49, respectively.

Figure 2:
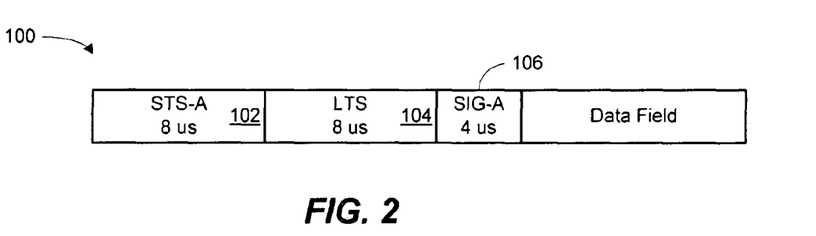
FIG. 2 shows an 802.11a wireless local area network (WLAN) preamble format, which includes short training sequence (STS), long training sequence (LTS) and signal field (SIG), for physical (PHY) receiver training and initialization. Data field follows preamble.

FIG. 2 shows an 802.11a WLAN preamble format 100, which includes short training sequence (STS) 102, long training sequence (LTS) 104 and signal field (SIG) 106, in accordance with an embodiment of the present invention. A physical (PHY) receiver receives information in the 802.11a WLAN preamble format 100. The physical (PHY) receiver will use preamble to train and initialize receiver states. STS 102 provides packet detection, AGC, frequency and timing offset estimation, and symbol alignment. LTS 104 provides channel estimation and frequency offset estimation opportunity to support required performance. SIG field needs to be robust enough and carry large enough message. The total duration of the 802.11a preamble is 20 us.

Figure 3:
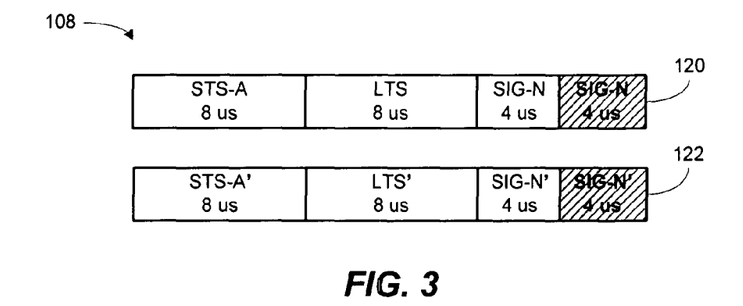
FIG. 3 shows World Wide Spectrum Efficiency (WWiSE) Greenfield preamble format for two streams case.

FIG. 3 shows WWiSE Greenfield preamble 108 for 2 streams case, a stream 120 and a stream 122 to be received by a receiver. A Greenfield preamble 108 is designed for new 11n modes only to reduce overhead with backward compatibility with legacy devices, and hence improve preamble efficiency. Greenfield design is the strength of WWiSE preamble, design as compared to TGnSync preamble. STS-A is the same as 11a short training sequence. STS-A' is a cyclic delay shifted version of STS-A. LTS is the same as 11a long training sequence. LTS' is a cyclic delay shifted (CDS) version of LTS by 1600 ns, which is an important design of WWiSE preamble. The CDS version of LTS provides 2×2 MIMO channel training opportunity and second frequency offset estimation at the same time (double symbol length or Bus only). However this design also bring up several issue, like non-per tone based channel estimation, which is more complex than per-tone based channel estimation and less suitable of transmit (TX) beamforming feature. TX beamforming is a technique to focus more energy on the desired direction. SIG-N is rate ½ convolutional coded quadrature phase shift keying (QPSK), which can carry two times the message of rate ½ coded bipolar phase shift keying (BPSK), however it is less robust. Under range extension mode, optional extra SIG-N is used to enhance the robustness of SIG-N. Greenfield preamble for 2-streams case is 20 us for non-extended range mode, and 24 us for extended range mode.

Figure 4:
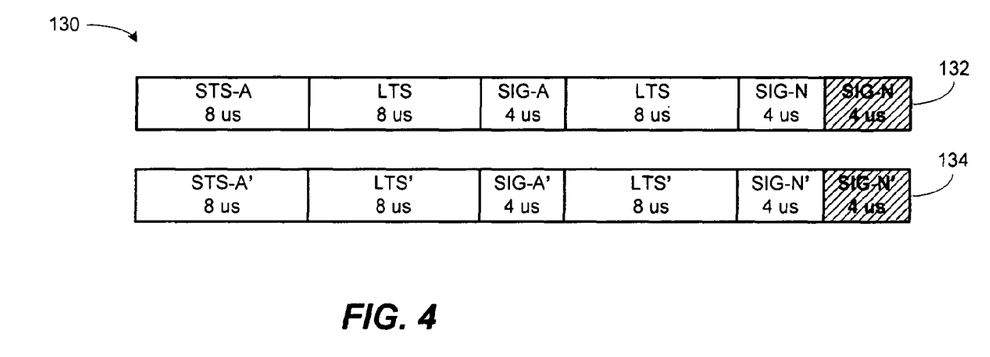
FIG. 4 shows WWiSE mixed mode preamble format for two streams case.

FIG. 4 shows WWiSE mixed mode preamble 130 for 2 streams case, a stream 132 and a stream 134. A mixed mode preamble means it is designed with backward compatibility with legacy devices in mind. However the drawback is less efficient preamble. WWiSE mixed mode preamble for 2 streams case is 32us for non-extended range mode, and 36us for extended range mode. Mixed mode preamble starts with legacy preamble, with the second stream adding cyclic delay shift. A second LTS follows the legacy SIG-A, is used, to train MIMO channel matrix, which is the same as Greenfield design. SIG-N is also the same as Greenfield design.

Figure 5:
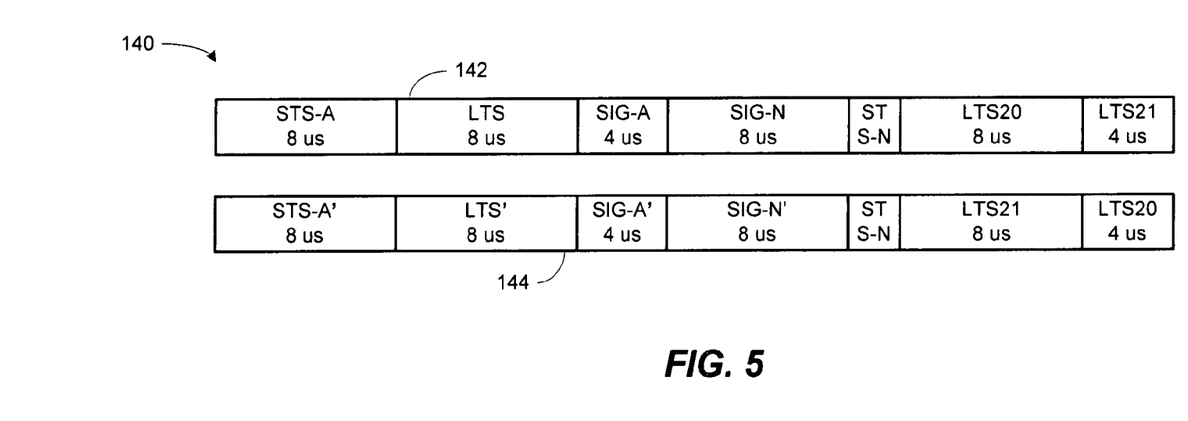
FIG. 5 shows Task Group N Synchronization (TGnSync) mixed mode preamble format for two streams case.

FIG. 5 shows TGnSync preamble 140 for 2 streams case, a stream 142 and a stream 144 to be received by a receiver. TGnSync preamble starts with legacy preamble similar to WWiSE mixed mode. Bus SIG-N follows the legacy preamble, which is noticeably different from WWiSE approach. SIG-N before long training provides several advantages, like noticing receiver how many antenna mode to expect for the following LTS; and SIG-N is immediately decodable by all receivers just like SIG-A. However, the drawback in this approach is not suitable for Greenfield type approach. SIG-N followed by second STS for second AGC control, which also indicate the start of TX beamforming if selected. 11n LTS is a sub-carrier interleaved (poly-carrier) version of legacy 11a LTS. LTSmk denotes index k within a set of m poly-carrier subsets, k=0 . . . m−1. For example LTS21 means there is totally 2 poly-carrier subsets, the index 1 is selected. Given constant transmit power, poly-carrier LTS does not provide an advantage over simpler antenna interleaving, that is antenna 1 occupies the first LTS slot wholly and only, antenna 2 occupies the second LTS slot, etc. However in practice, power amplifier (PA) will limit transmit power, and a poly-carrier approach provides a chance to turn on all PA at the same time during LTS, and is thus preferred. The first 11n LTS is Bus in order to provide another chance for frequency offset estimation. The second 11n LTS is shortened to 4 us as a compromise for a more effective preamble design.

The major issue with TGnSync is lack of Greenfield preamble design, more generally the preamble is less efficient. The major issues with WWiSE preamble design are 1. forward/backward compatibility within 11n is not well thought, 2. per-tone based channel estimation is not available.

Figure 6:
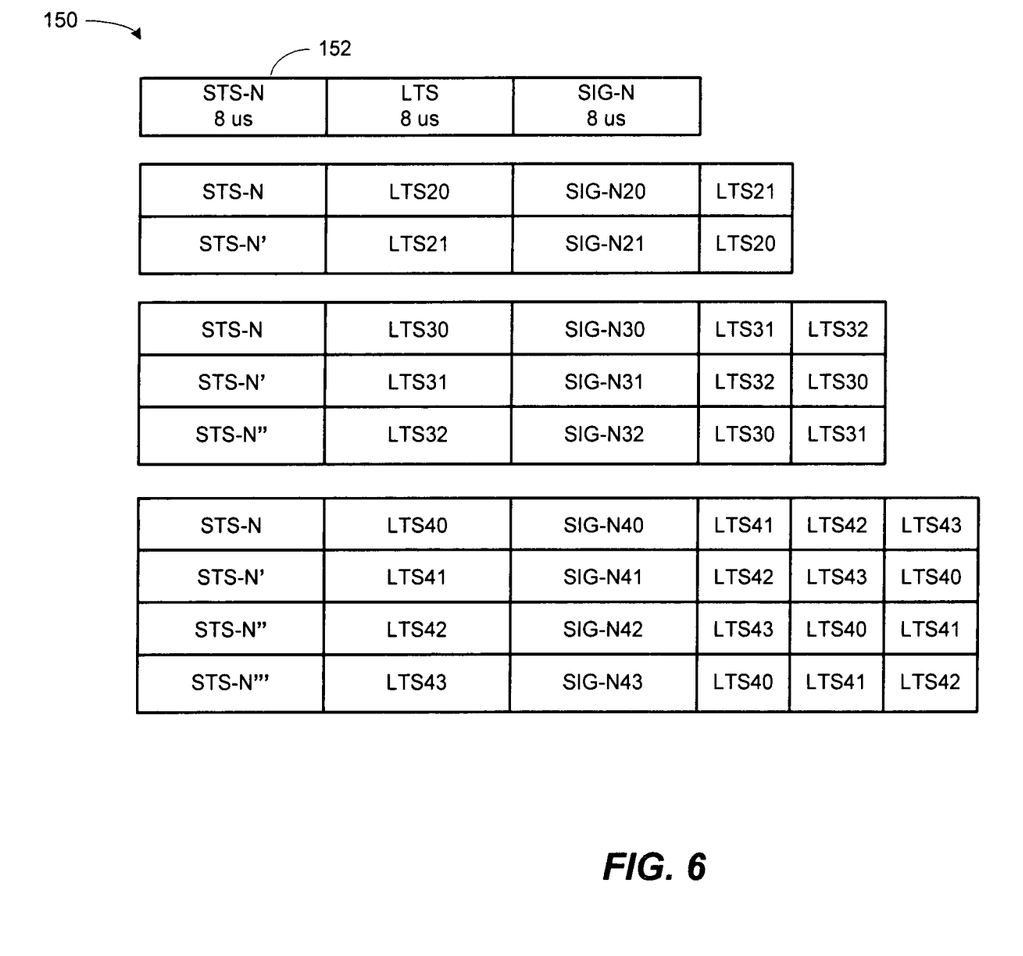
FIG. 6 shows nested Greenfield preamble formats for one to four streams cases.

We start off to resolve the WWiSE Greenfield issues. To provide better compatibility nested preamble is provided, a nested preamble is defined as receivers do not know the number of transmit antennas before decoding SIG-N. Notice that with nested preamble property, forward/backward compatibility within 11n is satisfied. FIG. 6 shows a proposed Greenfield preamble design 150 to be received by a receiver. Short training sequence is STS-N 152, which is different from legacy STS-A so that Greenfield and mixed mode can be distinguished as soon as possible. Using STS-N rather than STS-A has the advantage of requiring a smaller decoder in the receiver to identify the Greenfield preamble. One design of STS-N is through polarity change of STS-A. Multiple streams STS-N is provided by CDS, which is the same as WWiSE and TGnSync design. Poly-carrier LTS and SIG-N are used to provide nested preamble. Notice that with poly-carrier training sequence and signal field, receivers do not need to know what is the transmit antenna number, that is receivers are free to use their own number of receiver antennas to interpret LTS and SIG-N. This is achieved by dividing the signal to be transmitted into a plurality of subsets each of which being transmitted by a different antenna. Once received by the receiving antennas the plurality of subsets may be merged together to recover the transmitted signal. Thus, the number of transmitter antennas is independent of the number of receiver antennas. LTS is used for two purposes 1. Train receiver for decoding SIG-N, 2. To be reused to construct MIMO channel matrix using training sequences following SIG-N. For example, for the two antenna case 2 poly-carrier LTS are used to construct the 2×2 channel matrix. Similarly, for the three antenna case 3 poly-carrier LTS are used to construct the 3×3 channel matrix.

LTS is double symbol length that is 8us, so that second frequency offset estimation can be conducted. It also provides more robust training for SIG-N receiving. To provide compatibility poly-carrier LTS of 8 us duration are reused for both legacy and 11n preambles. SIG-N is also double symbol length with rate ½ coded BPSK, which provides one set of robust SIG-N design, which is the same as TGnSync design. Second poly-carrier LTS follow SIG-N are all single symbol length. Notice that poly-carrier LTS provide per-tone based channel estimation. In summary, the proposed Greenfield design provides an efficient design for TGnSync Greenfield preamble. It also resolves the compatibility and per-tone based training issue of WWiSE preamble. Given a 2 streams case, new Greenfield design requires 28 us, which is 4 us or 8 us longer than WWiSE Greenfield, but 4 us or 8us are shorter than WWiSE mixed mode and 14 us shorter than TGnSync preamble. Resides efficiency and/or resolve previous issue, this preamble framework is generic enough that trade-off and variation can be made, for example, a poly-carrier can be used for STS-N instead of CDS. An option in SIG-N to allow double length LTS after SIG-N to allow robust training sequence can be used. More importantly, variations and trade-offs are given at following two designs.

Figure 7:
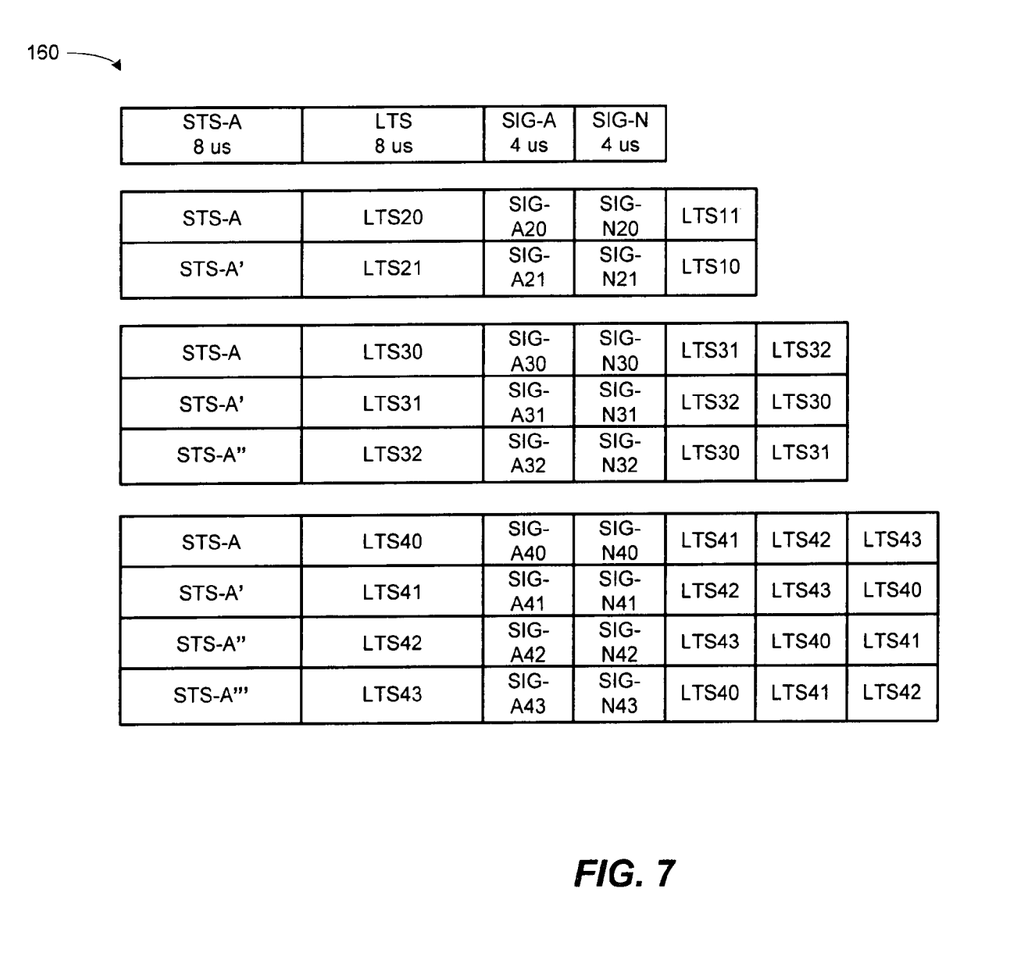
FIG. 7 shows nested preamble formats that combines Greenfield and mixed mode for one to four streams cases.

FIG. 7 shows the preamble variation 160 to merge Greenfield with mixed mode preamble. Notice that there are only two changes, firstly, STS-N is not needed, because there is no Greenfield or mixed mode, there is only one preamble format. So STS-A is used. The second change is double symbol length SIG-N has been partitioned into single symbol length SIG-A and SIG-N. Notice that up to SIG-A it is still a legacy 11a preamble from receiver viewpoint. The 13 bits length field in SIG-A is reused to indicate length of 11n packet such that 4 us SIG-N will be enough to provide the required 11n features. Thus, a marriage of Greenfield and mixed mode preamble is provided without increasing any preamble length.

Figure 8:
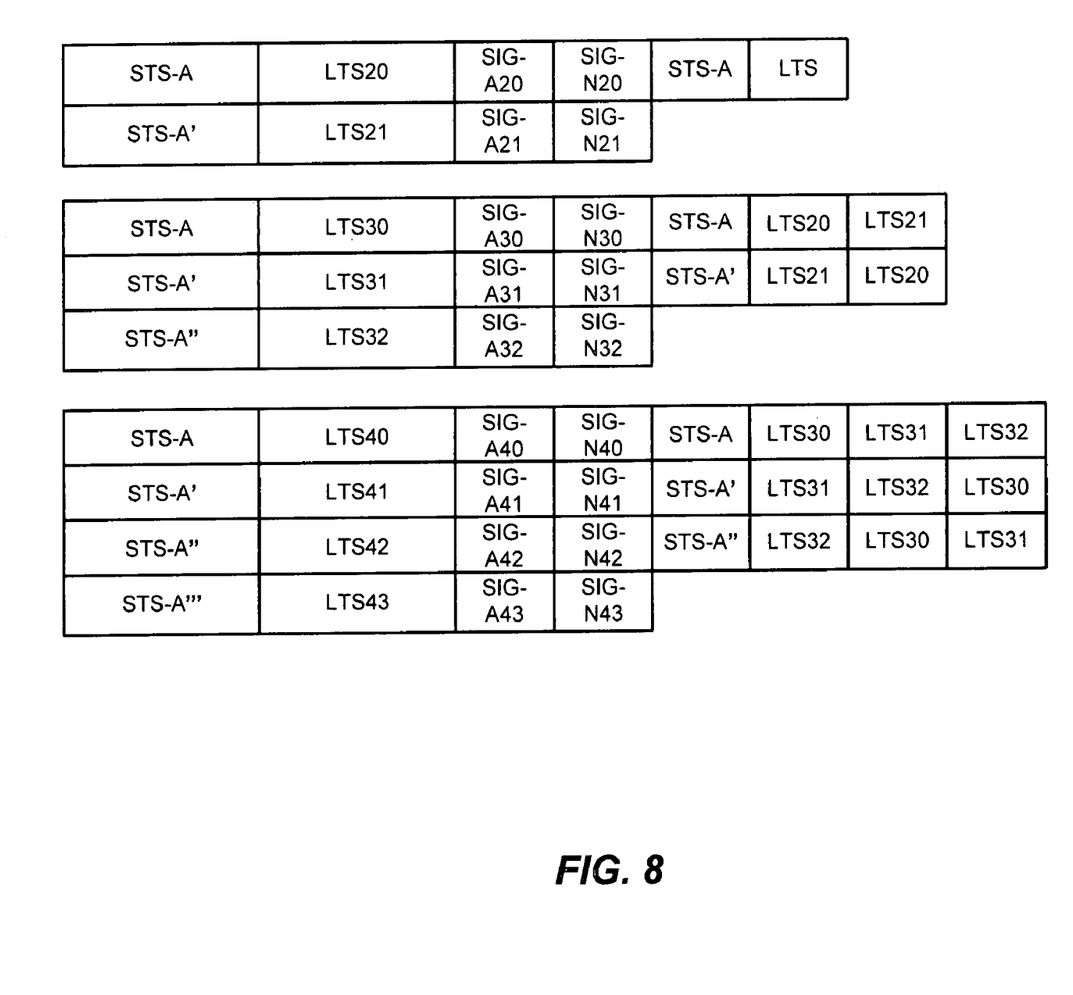
FIG. 8 shows nested preamble formats for transmit beam forming for one to three streams cases.
Figure 9:
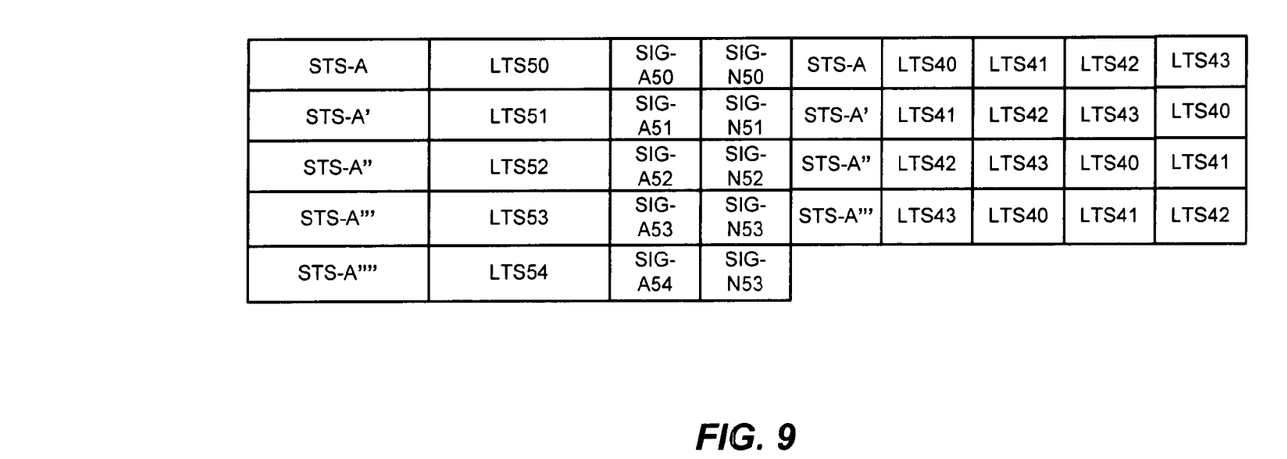
FIG. 9 shows nested preamble format for transmit beamforming for four streams case.

Up to this point new proposed preambles haven't provided TX beamforming capability. Thus, such feature is now added as a optional mode by indicating at SIG-N. FIG. 8 and FIG. 9 show the preamble extension for TX beamforming. After SIG-N a second AGC opportunity is added by using a second 4 us STS-A to align symbol boundary for simplicity. A second poly-carrier LTS is added after second STS-A to retrain the first phase of channel matrix. Notice that TX beamforming is added after the second STS-A, earlier trained LTS can not be reused for channel matrix construction. Given a 2 transmitter 1 receiver stream (2T1S1R) case, the proposed TX beamforming preamble format requires 32 us, which is still 6 us shorter than TGnSync's corresponding preamble. Only when transmit antenna number is greater than transmit streams, the beam forming effect can take place in current 11n purposes, so there is no need to provide TX beamforming preamble format for those cases that transmit antenna number is the same as transmit streams. However they can be added if necessary.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A multi input multi output (MIMO) system for transmitting and receiving packets that include a preamble comprising:
    a receiver; and
    a nested preamble, included in said packets, said receiver being responsive to the nested preamble, said nested preamble having poly-carrier long training sequence (LTS) and signal field (SIG) for training said receiver, at least some of said packets being transmitted using the modulation scheme of a wireless local area network (WLAN) standard, said nested preamble format for allowing said receiver to use one or more receiver antennas to interpret said LTS and said SIG to increase the efficiency of said MIMO system, said nested preamble including a second poly-carrier long training sequence (LTS) having double symbol length to provide per-tone based channel estimation, said nested preamble further including a second short training sequence (STS-A) having a single symbol length to align symbol boundary for simplicity, said STS-A being sent for adjusting automatic gain control (AGC), said second poly-carrier long training sequence (LTS) for providing transmit (TX) beamforming capability to focus energy in a desired direction.

2. A multi input multi output (MIMO) system as recited in claim 1 wherein said modulation scheme being an orthogonal frequency division multiplexing (OFDM) modulation scheme for transmitting said packets, said wireless local area network (WLAN) standard being the institute of electrical and electronics engineers (IEEE) standard having said OFDM modulation scheme, said MIMO system including one or more transmitter antennas for transmitting one or more data streams.

3. A multi input multi output (MIMO) system as recited in claim 2 wherein said poly-carrier signal field (SIG) being a rate V2 convolutional coded quadrature phase shift keying (QPSK), said SIG having double symbol length to enhance robustness.

4. A multi input multi output (MIMO) system as recited in claim 2 wherein said nested preamble enables forward/backward compatibility within said wireless local area network (WLAN) standard to allow said MIMO system to operate between the modes of said standard, said nested preamble format having a substantially short duration to increase the efficiency of said MIMO system.

5. A multi input multi output (MIMO) system as recited in claim 2 wherein said poly-carrier long training sequence (LTS) having double symbol length to provide channel estimation and frequency offset estimation.

6. A multi input multi output (MIMO) system as recited in claim 3 wherein said signal field (SIG) being partitioned into single symbol length signal fields SIG-A and SIG-N to indicate the length of said packets and provide features required by said wireless local area network (WLAN) standard.

7. A multi input multi output (MIMO) system as recited in claim 5 wherein said poly-carrier long training sequence (LTS) being reused for legacy and 802.11n standard preamble formats to provide forward/backward compatibility.

8. A multi input multi output (MIMO) system as recited in claim 1 wherein said nested preamble includes short training sequences-N (STS-N) being cyclically delay shifted (CDS) to provide packet detection, frequency and timing offset estimation, automatic gain control (AGC) and symbol alignment.

9. A multi input multi output (MIMO) system as recited in claim 1 wherein said nested preamble includes poly-carrier short training sequence-N (STS-N) to provide packet detection, frequency and timing offset estimation, automatic gain control (AGC) adjustment and symbol alignment.

10. A multi input multi output (MIMO) system as recited in claim 1 for turning on power amplifier (PA) during said poly-carrier long training sequence (LTS) to transmit said packets, said poly-carrier LTS having an index located within a set of poly-carrier subsets.

11. A multi input multi output (MIMO) system as recited in claim 1 for using legacy long training sequence (LTS) to generate said poly-carrier long training sequence.

12. A multi input multi output (MIMO) system as recited in claim 1 wherein said nested preamble includes short training sequences-A (STS-A) being cyclically delay shifted (CDS) to provide packet detection, frequency and timing offset estimation, automatic gain control (AGC) and symbol alignment.

13. A multi input multi output (MIMO) system as recited in claim 1 wherein said nested preamble includes poly-carrier short training sequence-A (STS-A) to provide packet detection, frequency and timing offset estimation, automatic gain control (AGC) adjustment and symbol alignment.

14. A multi input multi output (MIMO) system as recited in claim 1 wherein said second poly-carrier long training sequence (LTS) having double symbol length to provide per-tone based channel estimation.

15. A multi input multi output (MIMO) system as recited in claim 1 wherein said nested preamble includes a second short training sequence (STS-A) having double symbol length to align symbol boundary for simplicity, said STS-A being sent for adjusting automatic gain control (AGC).

16. A method for transmitting and receiving packets comprising:
training receivers, coupled to receive packets from receiver antennas, using a nested preamble included in packets and having poly-carrier long training sequence (LTS) and signal field (SIG), said nested preamble including a second poly-carrier long training sequence (LTS) having double symbol length to provide per-tone based channel estimation, said nested preamble further including a second short training sequence (STS-A) having a single symbol length to align symbol boundary for simplicity, said STS-A being sent for adjusting automatic gain control (AGC);
said second poly-carrier long training sequence (LTS) providing transmit (TX) beamforming capability to focus energy in a desired direction;
transmitting packets using the modulation scheme of a wireless local area network (WLAN) standard;
using one or more receiver antennas, the receivers using their own number of receiver antennas to interpret LTS without knowledge of a transmit antenna number; and
interpreting the LTS and SIG to increase efficiency.

17. A multi input multi output (MIMO) system for transmitting and receiving packets comprising:
means for training receivers using a nested preamble included in packets and having poly-carrier long training sequence (LTS) and signal field (SIG), said means for training configured to receive packets from receiver antenna, said nested preamble including a second poly-carrier long training sequence (LTS) having double symbol length to provide per-tone based channel estimation, said nested preamble further including a second short training sequence (STS-A) having a single symbol length to align symbol boundary for simplicity, said STS-A being sent for adjusting automatic gain control (AGC),
said second poly-carrier long training sequence (LTS) for providing transmit (TX) beamforming capability to focus energy in a desired direction;
means for transmitting packets using the modulation scheme of a wireless local area network (WLAN) standard;
means for utilizing one or more receiver antennas, said utilizing means being free to use their own number of receiver antennas to interpret LTS without knowledge of a transmit antenna number; and
means for interpreting the LTS and SIG to increase efficiency.

18. A multi input multi output (MIMO) system for transmitting and receiving packets comprising:
a receiver for receiving information formatted in a nested preamble included in packets and having poly-carrier long training sequence (LTS) and signal field (SIG) for training said receiver, said packets being transmitted using the modulation scheme of a wireless local area network (WLAN) standard, said nested preamble for allowing said receiver to use one or more receiver antennas, the number of one or more receiver antennas being independent of the number of transmitter antennas, to interpret said LTS and said SIG to increase the efficiency of said MIMO system, said nested preamble including a second poly-carrier long training sequence (LTS) having double symbol length to provide per-tone based channel estimation, said nested preamble further including a second short training sequence (STS-A) having a single symbol length to align symbol boundary for simplicity, said STS-A being sent for adjusting automatic gain control (AGC), said second poly-carrier long training sequence (LTS) for providing transmit (TX) beamforming capability to focus energy in a desired direction.

19. A multi input multi output (MIMO) system as recited in claim 18 wherein said modulation scheme being an orthogonal frequency division multiplexing (OFDM) modulation scheme for transmitting said packets, said wireless local area network (WLAN) standard being the institute of electrical and electronics engineers (IEEE) standard having said OFDM modulation scheme, said MIMO system including one or more transmitter antennas for transmitting one or more data streams.

20. A multi input multi output (MIMO) system as recited in claim 19 wherein said poly-carrier signal field (SIG) being a rate V2 convolutional coded quadrature phase shift keying (QPSK), said SIG having double symbol length to enhance robustness.

21. A multi input multi output (MIMO) system as recited in claim 20 wherein said signal field (SIG) being partitioned into single symbol length signal fields SIG-A and SIG-N to indicate the length of said packets and provide features required by said wireless local area network (WLAN) standard.

22. A multi input multi output (MIMO) system as recited in claim 19 wherein said nested preamble enables forward/backward compatibility within said wireless local area network (WLAN) standard to allow said MIMO system to operate between the modes of said standard, said nested preamble format having a substantially short duration to increase the efficiency of said MIMO system.

23. A multi input multi output (MIMO) system as recited in claim 19 wherein said poly-carrier long training sequence (LTS) having double symbol length to provide channel estimation and frequency offset estimation.

24. A multi input multi output (MIMO) system as recited in claim 23 wherein said poly-carrier long training sequence (LTS) being reused for legacy and 802.11n standard preamble formats to provide forward/backward compatibility.

25. A multi input multi output (MIMO) system as recited in claim 18 wherein said nested preamble includes short training sequences-N (STS-N) being cyclically delay shifted (CDS) to provide packet detection, frequency and timing offset estimation, automatic gain control (AGC) and symbol alignment.

26. A multi input multi output (MIMO) system as recited in claim 18 wherein said nested preamble includes poly-carrier short training sequence-N (STS-N) to provide packet detection, frequency and timing offset estimation, automatic gain control (AGC) adjustment and symbol alignment.

27. A multi input multi output (MIMO) system as recited in claim 18 for turning on power amplifier (PA) during said poly-carrier long training sequence (LTS) to transmit said packets, said poly-carrier LTS having an index located within a set of poly-carrier subsets.

28. A multi input multi output (MIMO) system as recited in claim 18 for using legacy long training sequence (LTS) to generate said poly-carrier long training sequence.

29. A multi input multi output (MIMO) system as recited in claim 18 wherein said nested preamble format including short training sequences-A (STS-A) being cyclically delay shifted (CDS) to provide packet detection, frequency and timing offset estimation, automatic gain control (AGC) and symbol alignment.

30. A multi input multi output (MIMO) system as recited in claim 18 wherein said nested preamble includes poly-carrier short training sequence-A (STS-A) to provide packet detection, frequency and timing offset estimation, automatic gain control (AGC) adjustment and symbol alignment.

31. A multi input multi output (MIMO) system as recited in claim 18 wherein said second poly-carrier long training sequence (LTS) has double symbol length to provide per-tone based channel estimation.

32. A multi input multi output (MIMO) system as recited in claim 18 wherein said nested preamble includes a second short training sequence (STS-A) having double symbol length to align symbol boundary for simplicity, said STS-A being sent for adjusting automatic gain control (AGC).

* * * * *